May 5, 1959    W. W. CLEMENTS    2,885,606
IMPULSE TYPE ELECTROMOTIVE DEVICE
Filed Oct. 19, 1956    4 Sheets-Sheet 1

INVENTOR.
WARNER W. CLEMENTS
BY R. W. Hodgson

May 5, 1959  W. W. CLEMENTS  2,885,606
IMPULSE TYPE ELECTROMOTIVE DEVICE
Filed Oct. 19, 1956  4 Sheets-Sheet 3

INVENTOR.
WARNER W. CLEMENTS
BY R. W. Hodgson

May 5, 1959 W. W. CLEMENTS 2,885,606
IMPULSE TYPE ELECTROMOTIVE DEVICE
Filed Oct. 19, 1956 4 Sheets-Sheet 4

INVENTOR.
WARNER W. CLEMENTS

United States Patent Office 2,885,606
Patented May 5, 1959

2,885,606

IMPULSE TYPE ELECTROMOTIVE DEVICE

Warner W. Clements, Los Angeles, Calif.

Application October 19, 1956, Serial No. 617,173

21 Claims. (Cl. 317—165)

This application is a continuation in part of my co-pending application, Serial No. 518,713, filed June 29, 1955, for improvements in Impulse-Type Electromotive Device, now abandoned.

My invention relates to electromagnetically actuated devices and more particularly to electromagetically actuated devices of the type designed to be intermittently energized electrically through a single circuit indifferent to polarity and to accomplish thereby a useful shift of an actuated movable element from one to the other of two predetermined positions for each succeeding energization, a continuing state of energization not being necessary between desired movements of the working member.

Attention is directed to the features which distinguish devices of the character described from other electromagnetically actuated devices that are also capable of shifting an actuated element alternately between two positions. First of all, in a device of the character described, as indicated by the wording above, no electrical power input is required in order to hold the actuated element in either of its stated positions; such devices may thus be said to be "bistable." This distinguishes them from devices in which a continuing state of energization is required in order to hold the actuated element in one of its two positions. Secondly, the "single-circuit" operation referred to distinguishes devices of the character described from bistable devices in which one circuit must be energized in order to shift the actuated element to one position and in which a different circuit must be energized in order to shift the actuated element to the other position. Thirdly, being "indifferent to polarity," devices of the character described are distinguishable from bistable, single-circuit devices in which D.C. energization with the polarity connected one way is necessary in order to shift the actuated element to one position and in which energization with the polarity connected the other way is necessary in order to shift said element to the other position.

In summation, to operate a device of the character described one simply turns the current supplying it on and then off again. For each time this process is repeated an actuated element in the device shifts from one to the other of two stable positions. Two "on-off" cycles, i.e., two separate periods of energization, are thus required in order to bring the actuated element back to a given starting point.

Although there is, at the present time, no universally accepted name for devices of the class described, they are perhaps most often called "two-position impulse-type" devices. "Impulse" in this connection means simply a current flow of short duration, having reference to the electrical current supplied to the device for energizing it. Most, if not all, "impulse-type" devices will work satisfactorily when energized by current flows of long duration, provided that the current is interrupted as required for re-cycling. However, as the name implies, these devices are particularly suited for operation under conditions where they will be energized only briefly each time a shift of the actuated element is required. This comes about because they are ungeared devices and their operation does not involve the elapsed time associated with using a plurality of strokes or revolutions in order to achieve a given useful movement. By the same token they are inherently comparatively low-force devices since they do not benefit from the accumulated energy that may be developed by such a plurality of strokes or revolutions.

These characteristics make two-position impulse-type devices particularly suited for use in relay (remotely controlled electrical switching) applications. They are also used, or could be, for operating latches, valves, escapements, clutches, ordnance triggers, visual annunciators, etc. In these applications they have certain advantages over other electromagnetically actuated devices that achieve the same mechanical results through different electrical control means. It is an advantage, for instance, to be able to achieve control through the transmission of brief impulses. In some applications the the stimulus available for control purposes is inherently brief. In other applications the total power consumed by the control operation must be conserved, particularly where the working member may be required to remain in either one of its positions for long periods. Further, it is often desirable to provide for "two-wire" control; that is to say that it is desirable to accomplish bistable operation without having to run more than two wires (or one wire and a common or ground connection) between the control point and the device itself. Still further, it is often an advantage to be able to use A.C. in the control circuit, which of course rules out the use of polarized (polarity sensitive) devices. Finally, it may be a particular advantage to be able to effect each shift of the actuated element by means of an identical operation of the control switching; here the advantage may lie specifically in the simplicity of the switching involved or else in the binary or driving-by-two effect of producing a given result on only every second switching operation.

As against these advantages, the two-position impulse-type devices in the prior art also have certain disadvantages. These disadvantages stem from the particular means used to secure the required alternating mechanical action from effectively identical electrical impulses. Usually the various means employed are wholly mechanical. That is to say that the essential magnetic action is arranged to be identical on the occasion of each energization, e.g., an armature is attracted to an electromagnet; then mechanical mechanism translates this repeating action into an alternating one. (An analogous translation is made inside the familiar pull-chain light switch whereby one pull of the chain turns the light on, a second identical pull turns it off, etc.) It is plain that any such arrangement must necessarily involve mechanical linkages and with them points that are subject to wear and productive of friction. Such a translating arrangement is moreover likely to require a long actuating stroke; a longer stroke, that is, than simple magnetic impelling mechanisms can deliver efficiently and economically. Between the friction and the long stroke, two-position impulse-type devices until now in general use require vastly increased amounts of instantaneous power to activate them as compared with that required by non impulse-type electromagnetic devices performing comparable tasks.

There exists another type of two-position impulse-type devices in which such a translation is not employed, but in which an action that alternates from one controlling impulse to the next is produced directly in the element upon which the magnetic forces act. This is unquestionably a step in the right direction. Unfortunately, the means so far devised for altering the essential magnetic operation from one impulse to the next are more complex and more critical than might be desired. Perhaps as a result of these prior-art shortcomings, devices of this last type are not now in general use, the above-mentioned translating type being apparently preferred in spite of its particular disadvantages.

It is an object of my invention to provide a novel two-position impulse-type electromagnetic device that is simpler, more reliable, and more efficient than comparable prior-art devices.

It is another object of my invention to provide a novel two-position impulse-type electromagnetic device that readily lends itself to a great many design variations, thereby facilitating its application to new and difficult tasks.

What follows is a relatively brief explanation of the basic principles of my invention that permit the attainment of the above objects:

Electromagnetic devices are often described as if they were variations of simple permanent magnet arrangements. Neither the language nor the theory of such an approach is adequate for describing the present invention. Accordingly, it will be necessary to first discuss electromagnetic devices generally and to then proceed to a more immediate discussion of the invention proper.

Electromagnetic devices are, by definition, energized by magnetic flux induced by the flow of electrical current. In any given practical instance the energizing current must flow in a wire and the wire must be arranged in the form of a coil means in order to effectively localize the flow and multiply its magnitude. (I use the term "coil means" as generic to "coil," "coils," and "distributed winding.")

Besides the coil means, it is also necessary to provide at least two pieces of magnetic (flux-conductive) material closely associated with the coil means and movable relative to one another. For the sake of simplifying construction it is usual to have all of the motion take place in one of the pieces; the other piece and the coil means as well can then remain fixed or stationary. More complicated arrangements are possible in which there are a plurality of stationary pieces and/or a plurality of movable pieces. In order to use a terminology broad enough to embrace all constructions, I will call the magnetic materials that remain stationary with regard to the coil means the "fixed magnetic structure" and will call the magnetic materials that are movable with regard to the coil means the "armature means."

The essential functioning of a device including the listed components is sometimes described as follows: When the coil means is electrically energized, by providing an electric current through it, the fixed magnetic structure thereby becomes "magnetized" and as a result attracts the armature means to itself. Unfortunately, the concept that it is uniquely the fixed magnetic structure that becomes magnetically energized leads to confusion when applied to those cases wherein the armature means is conspicuously larger, or more intimately associated with the coil means, than the fixed magnetic structure. Also, there exist practical devices in which the armature moves, in response to magnetic attraction, not immediately toward the fixed magnetic structure, but parallel to nearby surfaces of said structure.

A more rigorous approach is possible in terms of considering the armature means and the fixed magnetic structure to compose a single, overall structure which I will call the "magnetic circuit structure." It is required of such a structure, first of all, that it be arranged to be the recipient of, or conductor for, the maximum practicable flow of the magnetic flux that is induced by the coil means when the latter is energized. To that end such a structure must be arranged to constitute a highly desirable path for taking the flux where it has to go. Flux always loops about the effective flow of current. The shape of a magnetic circuit structure is limited accordingly. If it is to conduct the flux from any point to another, it must be shaped to describe at least part of some kind of a loop that could be associated with a coil means in realizable form. Another requirement is that the armature means and fixed magnetic structure must be so arranged that the flux will traverse them in turn; in other words they must be co-extensional in directions leading around the prescribed loop. It is also required that one or more air gaps be provided between the armature means and the fixed magnetic structure, said gap or gaps having characteristics that vary by virtue of the movement of the armature means. Finally, there is the obvious requirement that all pieces making up a magnetic circuit structure be made of magnetic materials. I mean to imply all of these necessary limitations whenever I use the term "magnetic circuit structure" hereinafter.

The loop around at least a part of which the magnetic circuit structure conducts the flux constitutes a magnetic circuit. The armature means and the fixed magnetic structure are necessarily arranged in series within this magnetic circuit. It can be seen by analogy with an electrical circuit that both the armature means and the fixed magnetic structure must be energized when the magnetic circuit is energized. In the magnetic sense there is no real distinction between the two components.

Like an electrical circuit, a magnetic circuit can be considered to exist and have measurable parameters even when it is not being energized. The parameter in a magnetic circuit that corresponds with resistance in an electrical circuit is "reluctance." In a magnetic circuit as defined by a practical magnetic circuit structure, most of the reluctance will reside in the air gap or gaps.

It is now possible to make the following statement about magnetic attraction: Components of a magnetic circuit structure lying adjacent an air gap therein will, upon magnetic energization of said structure, experience forces urging them to move in directions suitable for decreasing the reluctance of said air gap or gaps. The reluctance of an air gap can be decreased either by narrowing it or by increasing the area of magnetic material facing it from both sides. Consequently, the precise direction in which an armature will be urged by magnetic attraction will depend on the conformation of the associated air gap or gaps. The direction in which an armature will be moved by magnetic attraction will depend, as well, upon the motion permitted to it by its mountings. A somewhat simpler way of stating things is to say that if an armature is permitted to make a motion that will result in a decrease of reluctance in a magnetic circuit, the armature will make that motion in response to sufficient energization of the magnetic circuit. So stated, the proposition of the previous sentence conveys some idea of the tremendous latitude that is possible in combinations of magnetic circuit structures and armature mounting methods in electromagnetic devices. This latitude not only makes the present invention possible, but accounts for the variety of forms in which the invention may be embodied.

It is the strategy of my invention to do the following, each uniquely, and all in combination: First, provide a magnetic circuit structure, the armature means of which is mounted to be movable into either of two predetermined positions, but in which structure said armature means is not predominantly attracted toward one or the other of said positions when said structure is magnetically energized. Second, provide means for unbalancing the pattern of the magnetic attraction exerted upon said armature means so that the latter can be caused to be impelled from either position to the other, as required. Third, provide for automatically actuating the unbalancing means during each period when the magnetic circuit structure is not energized in order to set the stage for a stroke of the armature means from one to the other of said positions in response to subsequent energization.

I have mentioned unbalancing the pattern of magnetic attraction experienced by an armature means. In a strict sense this cannot be done without altering the shape of the magnetic circuit structure of which the armature means forms a part. In the subject invention the required alteration is secured by adding magnetic material to the magnetic circuit structure in one fashion in order to impart one of the required shapes and adding magnetic material, instead, in a different fashion to impart the other of the required shapes. However, this material is added on a temporary basis, being merely held in place against said structure as required. I will speak hereinafter of the added material being "applied to," "making contact with," or "engaging" the part of the magnetic circuit structure to which it is applied. I do not mean to imply by these terms that the contact need be immediate or intimate; actually there are no deleterious effects from a very small gap between structure and extending material.

The magnetic material to be added to the magnetic circuit structure forms part or all of a movable "auxiliary means." This means is arranged to be movable to bring the magnetic material into position against the magnetic circuit structure as required. That is to say that producing one or the other of the required patterns of magnetic attraction effective upon the armature means is simply a matter of moving the auxiliary means into one or the other of two positions, which two positions are accordingly called "working" positions. Note, however, that these may be relative positions. The specific portion of the magnetic circuit structure that is to be variously extended may be either the armature means or the fixed magnetic structure. When it is the armature means, the auxiliary means must be arranged to ride with the latter in order to maintain either given working position.

The magnetic material that is used for extending the magnetic circuit structure in one required fashion may or may not be the identical material that is used for extending said structure in the other required fashion. That is, the auxiliary means may incorporate either a single piece of magnetic material or two spaced-apart segments of magnetic material, one segment to be applied to the magnetic circuit structure in each of the working positions of the auxiliary means. In preferred embodiments the two-segment arrangement is used, for the sake of shortening the travel required of the auxiliary means. Where the two segments are used, it is not essential that both be mounted on the same supporting or spacing member. However, it is essential that both segments be arranged to move together. I intend to embrace all usable constructions when I state hereinafter that the auxiliary means is "movable strictly as a unit." This limitation necessarily applies where there is only one discrete part of magnetic material used or where there are two segments integrally mounted on a single, movable, supporting or connecting member. Where there are two segments separately movably mounted, the phrase means that the two must be so interconnected that the motion of either one is inelastically transmitted to the other, though such motion may have its direction or velocity altered in the transmission.

The elements of the invention that have been specifically mentioned so far include a magnetic circuit structure of a special type and an auxiliary means for, in effect, producing upon demand either of two modifications in said structure, each of which modifications will result in a different pattern of magnetic attraction acting upon the armature means in said structure when the structure as a whole is magnetically energized. The mode of motion permitted to the armature means by its mounting method is presumed to be determined in accordance with the two different patterns of magnetic attraction (or the other way around), so that according to one of said patterns the armature means will be impelled from a first predetermined position to a second predetermined position, and so that according to the other of said patterns the armature means will be impelled from said second position back to said first position. This all requires that the armature means (which may include two armatures, rather than one) be, like the auxiliary means, movable strictly as a unit. The two predetermined positions just referred to will hereinafter be called the "stable" positions of the armature means.

These elements, then, provide a combination in which the armature means, when in either of its stable positions, can be caused to shift to the other stable position by first placing the auxiliary means in the appropriate one of its working positions and then energizing the magnetic circuit. It remains necessary to provide means for automatically positioning the auxiliary means, to the end that when the energization is repeated intermittently the armature means will be caused to shift from one to the other of its stable positions upon the occasion of each fresh energization. The necessary additional function is fulfilled by a potential-energy-storing means, as for example a spring or other resilient means, mounted in driving relationship to the auxiliary mechanism. The last-named means is arranged to exert a force upon the auxiliary means whenever the armature means is in either of its stable positions. This force is in such a direction that if the magnetic circuit is not energized, said force will cause the auxiliary means to move to and remain in the appropriate one of its working positions for determining that upon subsequent energization the armature means will be impelled from the one of its stable positions currently held to the other stable position. After that, the force will bias the auxiliary means to change working positions every time the armature means changes stable positions.

As a practical matter, one cannot apply magnetic material to a magnetic circuit structure in such a manner as to affect the magnetic influences within that structure without at the same time having the added material itself become subject to magnetic attraction. In more immediate terms this means that in either working position of the auxiliary means, the segment of magnetic material that is applied to the magnetic circuit structure when the latter is magnetically energized will stick to said structure, thus holding the auxiliary means in a working position as long as energization persists. This effect serves a vital purpose in the present invention in that it prevents the energy storing means from causing a premature reversal of the forces acting upon the armature means. As it works out, the armature means changes positions during periods of energization and the auxiliary means changes positions between periods of energization. Each fresh energization finds the auxiliary mechanism already in proper position for bringing about a new stroke of the armature means.

The invention includes a coil means for providing the magnetic energization already frequently referred to. To clarify the nomenclature in this connection it might be well to point out that it is equally correct to say that a magnetic circuit structure serves to establish a preferred path for the flux induced by an existing coil means or to say that a coil means serves to energize a magnetic circuit (flux path) already established by a magnetic circuit structure. Since energizing a magnetic circuit necessarily involves energizing all magnetic materials lying in that circuit, the latter alternative statement can be rephrased to say that a coil means serves to energize a magnetic circuit structure. In order for a coil means to energize anything magnetically it must itself be energized electrically. A coil means is energized electrically by supplying it with a flow of current; meaning, of course, that the current is circulated through the wire that makes up the coil windings. In the event that two or more coils are used, the normal operation of the invention contemplates that these coils be energized simultaneously, not separately or alternately. I intend to imply this limitation in labelling the invention an "impulse-type electromagnetic device." Being a device of the stated class, it must be capable of being energized through a single circuit, that is to say through two connections. Accordingly, a plurality of coils, when used, will normally be connected in series or parallel so that all may receive current.

The elements set forth so far are all essential components of the invention. In addition to these there is another that in some circumstances is included and in other circumstances is not. In any practical embodiment the device will presumably be subject to forces that would tend to dislodge the armature means from either of its stable positions. Also, the energy storing means, being responsive to the position of the armature means, may tend to de-position the latter at the same time that it serves to position the auxiliary means. Accordingly, it is necessary to provide that the armature means be normally retained in either of its stable positions pending operational shifts from one to the other. This is a case where a function is essential, but there may or may not be a physical element required to carry it out. The function may be performed by structure primarily intended for other purposes. In one illustrative embodiment to be described, the resilient means that drives the auxiliary means also serves to hold the armature in its stable positions. In another instance the device might be used with the armature coupled to equipment itself having an inherent snap-action or friction-lock effect. For that matter enough friction to suffice could be provided, in a crude embodiment, within the mounting for the armature means.

On the other hand, it might be desirable to incorporate separate means for carrying out the function, such means as a toggle spring or a detent arrangement. The use of a properly arranged toggle spring has the advantage that it can be made to function to transport the armature means into one or the other of its stable positions from almost any possible position and thus prevent it from getting stalled or stranded outside of a stable position between periods of energization.

The elements thus outlined, together with incidental components which can be contrived by any skilled mechanic, make up the invention. In a simple version the invention can be made up of a coil, a one-piece fixed magnetic structure, an armature, a spring, and a one-piece auxiliary means. This represents almost the irreducible minimum of complexity, as even the simplest possible practical electromagnetic device must incorporate the first four out of these five components. (Of course the presence of the fifth component necessarily involves the provision of a mounting for said component, but this need add little to the overall complexity.)

The achievement of reliability in the present invention is closely related to the achievement of simplicity. In not requiring parts present in comparable prior art devices, particularly in not requiring ratchets, pawls, cams, or catches, the invention has avoided sources of wear and malfunction. Note that no rigid coupling need be attached to the auxiliary means; the latter is usually driven by a resilient means, which can be relatively wear-free.

Similarly, the absence of rubbing surfaces means the absence of friction, which in turn contributes to the efficiency. Most importantly contributing to the efficiency is the short stroke of the armature means, which can be made almost as short as desired. On the other hand, where a long stroke of an armature means is required, it can be provided without serious sacrifice of efficiency. (This will be more fully explained in connection with one of the illustrative embodiments.)

The armature means is not required, as is its equivalent in prior art devices, to be arranged to move in one certain mode, namely a mode suitable for actuating relatively complicated internal mechanism. On the contrary, the only internal mechanism that need be operated in the present invention, the so-called auxiliary means, is actuated indirectly through non-rigid means and, moreover, can be mounted to move in a mode matching any in which the armature means can be arranged to move. As a result, the armature means itself can be designed to move in the mode and over the range best suited for a given application. Other specifications, such as mounting position, coil arrangement, counterbalancing, etc. are equally flexible in the design process.

The above advantages apply rather generally to prior art devices which are comparable to my invention. Special mention should be made of a small group of those devices which resemble my invention to the further extent that in each of them the required alternating output action is elicited directly in the armature means. (The existence of such devices is mentioned near the outset of this document.) A related similarity between devices of the indicated group and my invention is that the devices in question provide for the shuttling about or shifting of magnetic material in the interims between periods of energization. However, the similarities mentioned are strictly superficial ones. Attention is directed to the following differences, which extend deeply into the realm of principle and which each are attended by specific advantages, the sum of which is attainable only by virtue of my invention:

(1) In the prior art devices just referred to, the magnetic material which is moved during periods of de-energization constitutes a considerable portion of the magnetic circuit structure. In my invention, by contrast, the corresponding magnetic material is so relatively small in bulk that it can be considered to be merely incremental or supplemental to the magnetic circuit structure; the latter structure can be seen to exist in recognizable form even in the total absence of the auxiliary movable material.

In short, my invention teaches a way to make moving a small amount of material produce a result comparable to that formerly produced by moving a much larger amount of material. This is an improvement of tremendous value, inasmuch as the smaller amount of material is easier to support, requires less stored energy to move, moves more quickly, and is less subject to the effects of vibration.

(2) In certain of the prior art devices of the indicated group, what might be called a "duplicated pole" arrangement is used. In a device using such an arrangement there can be found at one or both magnetic terminations of the fixed magnetic structure two poles instead of the conventional one. The poles in each pair are spaced apart from one another. In other words, the magnetic circuit defined is forked at the poles, resulting in doubling the number of variable air gaps. Only one pole of each pair will actually be put to use at any given instant, much of the flux being diverted away from the idle pole.

In my invention, by contrast, each pole in the fixed magnetic structure is "singular." By that I mean that it remains continuously in the principal flux path and at no time is there an idle alternate or counterpart. Those skilled in the art will appreciate that one of the most important design objectives in electromagnetic devices is to place each working gap as near as possible to the hole through a coil. If the magnetic circuit structure must extend from either side of the gap for some distance before being surrounded by a coil, it means a huge loss in efficiency due to the quantity of flux which goes elsewhere than through the gap. But a coil only has one hole. Therefore, in a device which requires forked poles in the fixed magnetic structure, it necessarily follows (if coils, too, are not to be duplicated) that the poles must be located an undesirable distance from the hole in any coil.

So it is that my invention, in teaching how singular poles can be utilized, permits a huge advance in the matter of efficiency over the particular prior art just referred to.

(3) In certain other prior art devices of the subject group, the magnetic material which is moved between impulses is retained in position during impulses by means of latch or catch mechanisms. In my invention, by contrast, magnetic attraction alone does the job of keeping the auxiliary magnetic material in place during energization. Latch mechanisms are subject to wear and malfunction and they add to the initial expense of a device. The doing away with their use in my invention is a truly valuable contribution to the art.

(4) Still other prior art devices of the subject group require the harnessing of momentum effects and the incorporation of supplemental electrical switching of the energizing impulse for their successful operation. Here, again, my invention permits an advance in simplicity and reliability over devices that bear to it a superficial resemblance. Supplemental switching is not necessary to the operation of my invention. Neither are momentum effects (although the designer may want to take advantage of them for special purposes).

Other objects and advantages will be made apparent to one skilled in the art by the following description of illustrative embodiments, taken in conjunction with the accompanying drawings, in which:

Figs. 1, 2, 3, and 4 are drawings depicting a first illustrative embodiment of the invention. The device represented may be mounted in any position but is here shown with its central core vertical so that all views may be considered to depict the device in an upright position. Figs. 1, 2, and 3 show in temporal sequence the effect on movable parts of supplying current to the device for a single, finite period.

Figs. 5, 6, and 7 are drawings depicting a second illustrative embodiment of the invention. These views show, in temporal sequence, the effect on movable parts of supplying current to the device for a single, finite period.

Figs. 8, 9, and 10 are drawings depicting a third illustrative embodiment of the invention. These views show, in temporal sequence, the effect on movable parts of supplying current to the device for a single, finite period.

Figs. 12 and 13 are drawings depicting a fifth illustrative embodiment of the invention.

With particular reference to the embodiment shown in Figs. 1 through 4:

Magnetic energization is provided by coil means, in this case a single coil, indicated at 1. For purposes of operating the device the two terminals of the wire in the coil must be connected to an external circuit, which circuit would normally include a switch and a source of electric power. Such external circuitry does not, however, form a part of the invention.

The fixed magnetic structure comprises a core 2 and a U-shaped magnetic member 7 joined to said core. The end of the core that is uppermost in the views is a magnetic termination of the fixed magnetic structure and hence constitutes a pole thereof. I will hereinafter call the other end of the core, the one that is lowermost in the views, the "interpodal" end.

The armature is indicated generally at 11. It is built up of bars 14 and a piece of C-channel 12, the bars extending from the open sides of the channel at the ends of the latter. (A worthwhile modification where the application justifies the added cost is to make the web, or middle side, of the C-channel a separate piece of non-magnetic material.) The armature is pivoted on pins 15, said pins having a press fit in magnetic member 7. Small bushings are shown, which provide bearing and thrust surfaces, but such bushings are not essential. The overlapping surfaces of the armature and the magnetic member minimize the reluctance between these components.

The armature and fixed magnetic structure together compose the magnetic circuit structure. The magnetic circuit defined or established by said structure is most clearly indicated in Fig. 4. The core conducts the flux through the center of the coil and the magnetic member takes it a part of the way around the outside of the coil. The armature takes over from there and extends the preferred path for the flux to the region of the pole, leaving the magnetic circuit to be completed through the air near the pole.

Figure 4:
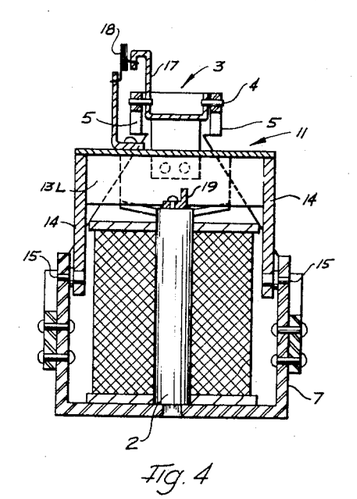
Fig. 4 is a central vertical sectional view taken on a plane perpendicular to the sectioning plane of Fig. 1. For clarity the movable parts are shown as they would appear if held at their respective centers of travel (an artificial position never normally maintained in actual operation).

It can be seen that a single path is provided for the flux where it lies through the coil, but that the path branches and becomes a dual path around the outside of the coil. It's all one magnetic circuit, however, as only one flow of current is encircled; no two lines of flux occupy the same space in any arrangement of conductors. (The dual outer path is a mere design detail and is by no means requisite. Satisfactory embodiments exist that are similar to the one shown except for having only one outer flux path, the armature being straight or L-shaped.) The coil is in proper relationship to this magnetic circuit, so that supplying said coil with a flow of current will cause the magnetic circuit to become energized.

Figure 1:
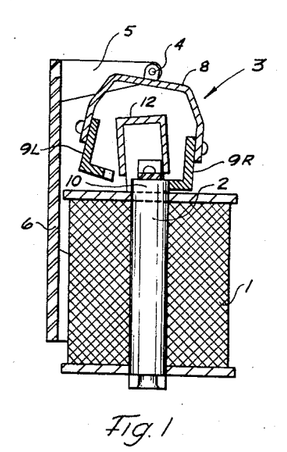
Fig. 1 is a central vertical sectional view. Movable parts are shown as they might be positioned to start with, with the control current "off."

The air gap through which the magnetic circuit is completed is most clearly shown in Fig. 1. Considering for the moment only the basic flux-conducting structure, that air gap is located between the armature and the pole. The part of the armature that is nearest to the pole is movable to the observer's left and right. The range of permitted motion is limited by a stop 19 which is made of non-magnetic material and is mounted on the pole to engage either flange of the armature. It can be seen that a full stroke of the armature in either direction will result in no net change of the reluctance of the air gap specified and hence the armature will not be attracted predominantly in one direction or the other when the magnetic circuit is energized.

To pattern the force of magnetic attraction so that it will impel the armature in either direction, as desired, a movable auxiliary mechanism (which in this case is an auxiliary member, being of one-piece construction) is provided and is indicated generally at 3. It comprises two spaced segments 9L and 9R of magnetic material integrally connected by a yoke 8 of non-magnetic material. The auxiliary member is pivoted on pins 4 carried by a non-magnetic supporting member 6. This method of mounting allows the auxiliary member to move pivotally between its Fig. 1 position wherein it is applied to the pole to effectively extend the latter to the right and upward and its Fig. 3 position wherein it is applied to the pole to effectively extend the latter to the left and upward. In either case the air gap is effectively relocated and now exists primarily between the armature and that one of the segments which is applied to the pole. (For the sake of clearly revealing the mechanical operation, the stroke of the armature has been depicted in Figs. 1 through 3 as somewhat longer than it would preferably be. With a shorter stroke and segments shaped to match, the air gaps indicated would, of course, be narrower than shown.) If both the armature and the auxiliary member are in their Fig. 1 positions when the magnetic circuit is energized, it can be seen that a shift of the armature to its Fig. 2 position would result in pronounced decrease of the reluctance in the air gap. Accordingly, upon energization, magnetic attraction will impel the armature from its Fig. 1 position to its Fig. 2 position.

Figure 2:
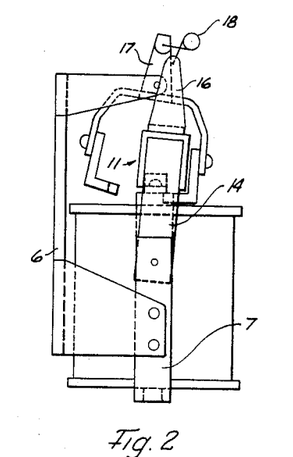
Fig. 2 is an elevation, similar in aspect to Fig. 1. (Additional parts are here visible that were cut off in Fig. 1 due to being toward the viewer from the sectioning plane.) Movable parts are shown as they might be positioned while the control current is "on."
Figure 3:
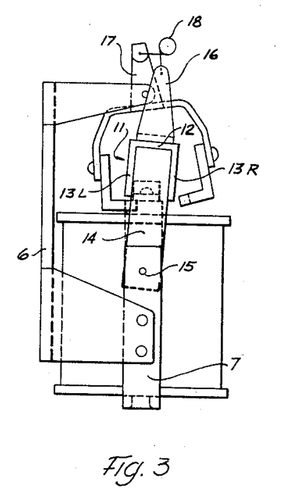
Fig. 3 is an elevation, similar in aspect to Fig. 2. Movable parts are shown as they might be positioned with the control current again "off."

A resilient means, specifically a clipspring 18, connects the auxiliary member to the armature. This spring is mounted between an ear 17 extending upward from the yoke part of the auxiliary member and a bracket 16 mounted on the armature. The geometry of the parts is so arranged that the maximum travel of the armature end of the spring exceeds the maximum travel of the auxiliary member end of the spring. Also, the spring is arranged to have a strong tension tending at all times to spread its two ends apart. The result is that when the armature shifts from its Fig. 1 to its Fig. 2 position in response to energization, the spring goes "over center" at some point along the way. In the situation of Fig. 2 the effect of the force exerted by the spring is to bias the auxiliary member to shift to its Fig. 3 position. However, as long as the magnetic circuit is energized the auxiliary member will not respond to this force because it will be retained in position by magnetic attraction between segment 9R and the pole. But immediately upon de-energization the urging of the spring will cause the auxiliary member to shift to its Fig. 3 position. The spring 18 as represented in Fig. 3 is still under spreading tension and will therefore serve to retain the armature in its extreme position. The same thing applies under the conditions of Fig. 1, which is the mirror image of Fig. 3 insofar as the movable parts are concerned. Consequently, the spring fulfills two functions: it sees to it during periods when the magnetic circuit is not energized that the auxiliary member will be positioned properly for producing a stroke of the armature in response to the next energization, and it serves to retain the armature in either of its extreme positions (which thereby become stable positions), even returning said armature to one or the other of said positions should it become dislodged.

Starting with the illustrated embodiment in its Fig. 1 condition, it can be seen from the foregoing that the end effect of energizing the magnetic circuit (by supplying current through the coil) and then de-energizing it is to shift the movable parts from their Fig. 1 to their Fig. 3 positions. If subsequently a flow of current is again supplied to the coil for a time and then cut off, the parts will be shifted from their Fig. 3 positions back to their Fig. 1 positions, the sequence of events being similar, but the directions of motion being reversed. The intermediate condition of the latter sequence, i.e., the position of movable parts after the armature has moved but while the device is still energized, would be shown by the mirror image of Fig. 2.

The armature inherently has a rapid "snap" action. Unless it is harnessed to some kind of a load that will seriously slow that action, which will not ordinarily be the case, the controlling current need be "on" for only a brief period. Similarly, the auxiliary movable member will shift quickly while the current is "off"; in other words, only a short "recovery time" is needed. The result is that the device will respond to rapidly succeeding energization and de-energization. Another way of putting it is to say that the device will respond to a series of electrical impulses.

The resultant reciprocative action of the armature can be harnessed in various ways to perform useful tasks. The flat outer surfaces of the bars 14 provide convenient space on which to mount components to be moved, or coupling or driving means. If the device is to be used as a relay the necessary arrangements are fairly obvious. One or movable contacts must be mounted on the armature. These must be arranged to cooperate with fixed contacts at one or both extremes of travel. The fixed contacts can be mounted on a flat piece of insulating material affixed to the supporting member 6. Lugs or binding-posts can be provided, mounted on the same insulating material, to which external wiring can be conveniently attached. (No such arrangements are shown in the drawings because it would have included them would have seriously impaired the clarity of the drawings.)

Figures 5, 6, 7:
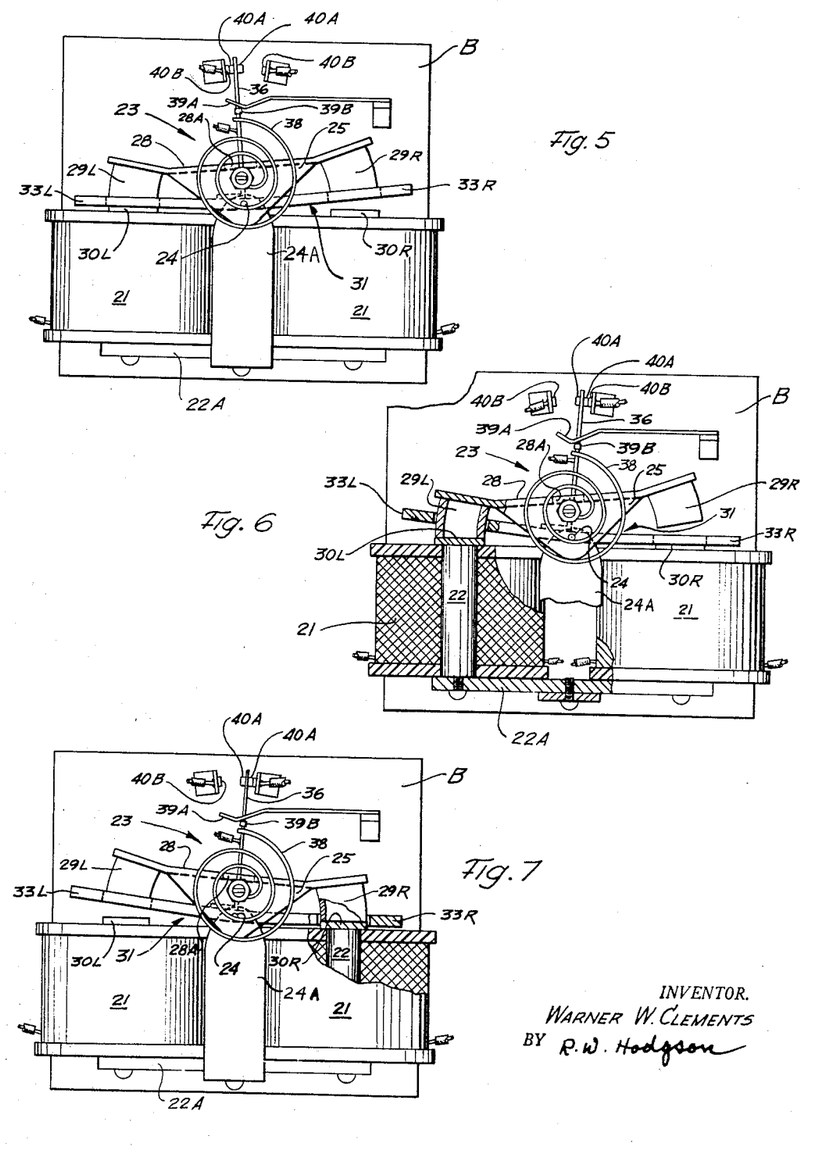
Fig. 5 is a plan view. Movable parts are shown as they might be positioned to start with, with the control current "off."
Fig. 6 is a plan view similar to Fig. 5, but showing a portion of the device cut away to better reveal the inner structure. Movable parts are shown as they might be positioned with the control current "on."
Fig. 7 is a plan view similar to Fig. 6, but showing a different portion of the device cut away. Movable parts are shown as they might be positioned with the control current again "off."

With particular reference to the embodiment shown in Figs. 5 through 7:

Support for principal parts is provided by a supporting member 24A, which must be made of non-magnetic material. This member would appear U-shaped in elevation. It is mounted by its lower (farther from the observer) leg to a base B made of insulating material.

The fixed magnetic structure comprises two cores 22 connected at one end of each by a magnetic member 22A, forming an overall structure that is generally U-shaped and has one of said cores for each of its parallel legs. The two terminations of this structure, namely the ends 30L and 30R of the respective cores, are either enlarged in a radial sense or have affixed to them small pieces of magnetic material for imparting the shape of ends so enlarged. However fabricated, these ends represent the poles, or magnetic terminals, of the fixed magnetic structure. An armature, indicated generally at 31, is mounted in a generally bridging position between said poles to complete the magnetic circuit structure, which structure can be seen to define a magnetic circuit that is roughly rectangular in shape.

Two coils 21 are provided for energizing the magnetic circuit thus established. These coils are intended to be energized or de-energized simultaneously, and so should be connected in series or in parallel, with proper polarity observed so that they aid each other magnetically. The proper manner of connecting said coils to each other and to external circuitry will be readily apparent to one skilled in the art.

The armature 31 is pivoted at its center on pins 24 carried by supporting member 24A. It has openings at both ends shaped and placed to admit poles 30L and 30R in turn as it moves pivotally. Enough clearance is provided so that the armature does not make actual contact with either of the poles in any position. For the sake of efficiency the perimeters of the poles should be made as long as possible consonant with other design requirements. To that end the faces of the poles (the areas that would appear in a projection plane normal to the axes of the coils) have been made rectangular rather than round in the embodiment shown. However, the theory of operation does not call for any particular shape. In addition to being large enough to clear the poles, the openings in the armature should closely match the perimeters of the respective poles for at least a part of the way around those perimeters. A workable (but inefficient) design variation exists in which the openings in the armature are dispensed with entirely and in which it is the blunt ends of the armature that face the poles.

Whatever the shape of the poles and the armature ends or openings, it can be seen that the magnetic circuit includes two air gaps, one located at each of the poles. Neglecting for the moment the auxiliary means, which has yet to be described, it can be seen that the respective reluctances of these air gaps will vary with movements of the armature; not only because the widths of the respective gaps vary, but because the area of overlap between armature and pole varies as well. In the embodiment as shown the variation in gap width is the predominant effect. However, with slight modification (namely a thickening of the poles) the variation in overlap can be made the predominant effect, producing equally satisfactory results. Note that a stroke of the armature that produces a decrease in reluctance at one of the poles simultaneously produces an increase in reluctance at the other of the poles and vice versa. However, the reluctance in the magnetic circuit as a whole will not be significantly affected by a full stroke of the armature in either direction. Consequently, when the magnetic circuit is energized the armature will not be attracted predominantly in one direction or the other.

To pattern the force of magnetic attraction so that it will impel the armature in either direction as required, a movable auxiliary means (which in this case is an auxiliary member, being of one-piece construction) is provided. The auxiliary member is indicated generally at 23. It comprises two spaced segments 29L and 29R of magnetic material integrally connected by a yoke 28 of non-magnetic material. The same pivot pins 24 that carry the armature also support the auxiliary member for pivotal motion around the same axis. However, where the armature rides between the legs of the supporting member 24A, the ears 25 which support the auxiliary member ride on the respective outer faces of those legs. The motion of the auxiliary member is limited to that between the extreme wherein segment 29L engages pole 30L as in Fig. 5 and the extreme wherein segment 29R engages pole 30R as in Fig. 7. Both segments are shaped to match the faces of the poles and to maintain a substantially constant clearance from the armature when there is relative movement between the latter and the auxiliary member. As shown in Fig. 6 the segments are hollowed out. This construction reduces the mass of the auxiliary member but is by no means an essential construction.

The function of the segments is to keep constant, despite movements of the armature, the reluctance at either pole to which one of them may be applied. For instance, with the auxiliary member in its position of Fig. 5 a shift of the armature from the latter's Fig. 5 position toward its Fig. 6 position would make little difference in the reluctance at pole 30L as effectively extended by segment 29L. Meanwhile, a substantial decrease will have taken place in the reluctance at pole 30R, thus resulting in a decrease of total reluctance in the magnetic circuit. As a result, according to principles previously discussed the armature will be magnetically impelled from its Fig. 5 to its Fig. 6 position whenever sufficient energization of the magnetic circuit is provided.

A spiral spring 38 is provided, said spring being connected at its inner end to the auxiliary member and at its outer end to an arm 36 which is affixed to the armature. (An opening 28A in the yoke part of the auxiliary member permits this arm to extend outward and move as the armature moves without striking the auxiliary member.) The spiral spring is adjusted at the time of assembly of the device to bias the auxiliary member to assume a symmetrical position with regard to the armature. Consequently, with both of these components in their Fig. 6 positions the spring will be under tension biasing the auxiliary member to move to its Fig. 7 position. As long as energization continues the auxiliary member won't budge, as it is held fast by magnetic attraction between pole 30L and segment 29L. Immediately upon de-energization the auxiliary member will respond to the tension in the spring and make the indicated shift.

Meanwhile the armature is yieldingly retained in its Fig. 6 position by virtue of tension in leaf spring 39A which bears against shoulder 39B of the arm extending from the armature. (The same mechanism serves to maintain the armature in its position of Figs. 5 and 7 until it is operationally impelled therefrom.) The maximum travel, in degrees, permitted to the armature is arranged to be greater than that permitted to the auxiliary member. The result is that when movable parts are in either their Fig. 5 or their Fig. 7 positions some tension remains in the spiral spring, said tension tending always to hold the appropriate segment in engagement with its corresponding pole.

Starting with the illustrated embodiment in its Fig. 5 condition, it can be seen from the foregoing that the end effect of energizing the device (by supplying current through the coil) and then de-energizing it is to shift the movable parts from their Fig. 5 to their Fig. 7 positions. If subsequently the device is again energized for a time the parts will be shifted from their Fig. 7 positions back to their Fig. 5 positions, the sequence of events being similar but the directions of motion being reversed. The intermediate condition of the latter sequence, i.e., the position of movable parts after the armature has moved in response to energization and while that energization persists, would be shown by the mirror image of Fig. 6.

The arm 36 which extends from the armature carries electrical contacts 40A adapted to engage contacts 40B in response to operational shifts of the armature. The particular switching arrangement shown (purely by way of illustration) is that known as "SPDT," by means of which two circuits can be controlled. Provided with such switching, the overall function of the device would be to close one circuit and open another upon each electrical energization. However, not only can different kinds of switching be accomplished with this embodiment of the device, but the reciprocative motion of the armature can be harnessed to accomplish a myriad of tasks other than switching.

Figure 11:
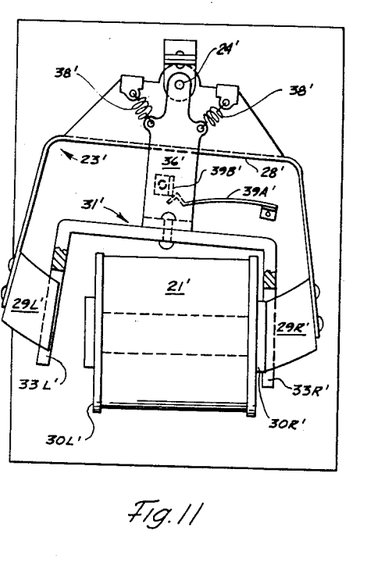
Fig. 11 is a drawing depicting a fourth illustrative embodiment of the invention. It is a plan view showing the upper tines of the forked ends of one of the parts (the armature) cut away to better reveal the construction beneath.

With particular reference to the embodiment shown in Fig. 11:

This embodiment is similar in principle to the embodiment of Figs. 5 through 7. To emphasize the similarity corresponding parts in the two embodiments have been given the same reference characters except that a prime mark has been added to the Fig. 11 characters. The principal basis for the differences that exist between the two embodiments is that the one now to be considered has only one coil. The coil 21′ encloses a single core, shown dotted. This core is the whole of the fixed magnetic structure. It terminates in two radially enlarged ends 30L′ and 30R′, which constitute its poles.

The armature is indicated at 31′. Each of its ends is forked; that is to say that the openings corresponding with those provided in the Fig. 5 through 7 embodiment are slots rather than complete holes. For the purpose of arranging the motion of the ends of the armature to be in predominantly axial directions with regard to the poles, the armature is mounted on a supporting member (which member would appear U-shaped in elevation) which is hinged on pin 24′ at some distance from the coil. Stops projecting from the coil ends (but obscured by the poles in the drawing) engage the lower tines of the forked ends of the armature to limit the travel of the latter. A flat spring 39A′ is arranged to bear against a bracket 39B′ mounted on the armature for retaining said armature in either of its extreme positions pending operational shifts from one to the other.

The auxiliary member, indicated generally at 23′, consists of two segments 29L′ and 29R′ of magnetic material integrally supported by a yoke 28′ of non-magnetic material. The auxiliary member is arranged to pivot, by means of flanges bent from its yoke portion, on pin 24′, and is thereby movable between limits where one or the other of its segments makes matching engagement with the face of one or the other of the poles. Two coil springs 38′ couple the auxiliary member to the armature in such a manner that the former is biased to maintain a symmetrically neutral position with regard to the latter as the latter moves about their common pivotal axis. Accordingly, when the armature shifts from one of its stable (extreme) positions to the other the auxiliary member is biased to shift from one of its working (extreme) positions to the other, but is restrained from doing so while energization persists, due to magnetic attraction to one or the other pole.

The operating sequence in this embodiment is in every way comparable to that in the embodiment of Figs. 5 through 7. The armature shifts from one to the other of its stable positions in response to energization of the coil. The auxiliary member follows suit, shifting from one to the other of its working positions upon de-energization. Upon subsequent energization and de-energization the sequence repeats except that directions of movement are reversed. The reciprocative motion of the armature thus brought about may be harnessed to perform various useful tasks. The flat upper surface of the supporting portion of the armature provides a convenient surface on which to mount coupling or translating means. The device is particularly suited for performing electrical switching tasks. Various suitable arrangements will immediately occur to one skilled in the art.

As with other embodiments, a great many variations in design details are possible. Neither the openings in the armature ends nor the location of the pivotal axis at a point removed from the coil are essential to the design. On the basis of the above disclosure of the subject embodiment one skilled in the art will readily be able to construct a variation wherein the pivotal axis is close to the coil means and the openings in the armature are dispensed with. Alternatively, he will be able to construct a variation in which the armature and auxiliary member slide in directions paralleling the axis of the coil, rather than pivoting. Accordingly, such variations will not be described here.

Figure 8:
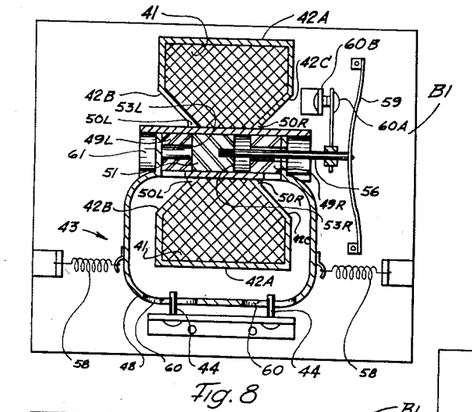
Fig. 8 is a horizontal sectional view as seen from above the device. The axis of the coil illustrated lies in the sectioning plane. (Parts lying entirely below the axis appear as they would in a plan view.) Movable parts are shown as they might be positioned to start with, with the control current "off."
Figure 9:
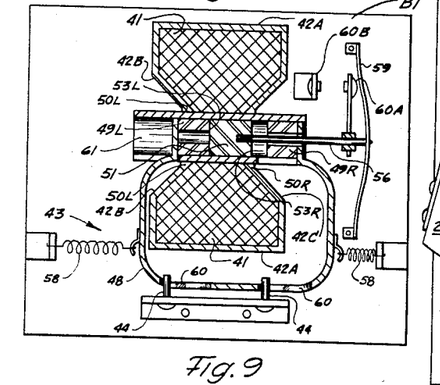
Fig. 9 is a horizontal sectional view similar to Fig. 8 except that movable parts are shown as they might be positioned with the control current "on."
Figure 10:
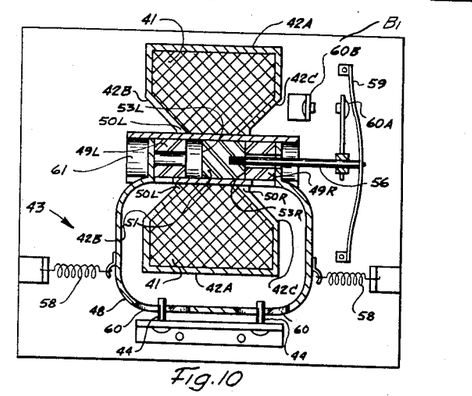
Fig. 10 is a horizontal sectional view similar to Fig. 9 except that movable parts are shown as they might be positioned with the control current again "off."

With particular reference to the embodiment shown in Figs. 8 through 10:

This embodiment uses a single coil 41. In contrast to other illustrative embodiments, the fixed magnetic structure surrounds the coil but does not extend within the central part thereof. Said fixed structure is made up of an outer cylinder 42A and two dished end plates 42B and 42C. (The conically dished shape of the ends of the coil and adjoining fixed magnetic structure is a minor design feature and entirely optional. Other suitable shapes are known to those skilled in the art.) The poles of the fixed magnetic structure are the annular portions 50L and 50R facing inner openings in the end plates.

The armature 51 is mounted to slide like a piston in a tube 61 made of non-magnetic material, preferably metallic. The extremes of travel permitted to the armature are represented respectively by its positions in Fig. 8 and Fig. 9. In Fig. 8 the armature and the fixed magnetic structure together define a magnetic circuit which includes an air gap between end 53R of the armature and pole 50R of the fixed magnetic structure. If the armature were alone in tube 61, a shift of said armature which would close this gap would only open up another of equal reluctance at the opposite end of the armature and hence result in no decrease of reluctance in the magnetic circuit. To permit a net decrease in reluctance as the armature moves to the observer's right, an auxiliary member is provided. This member is made up of two spaced segments 49L and 49R of magnetic material integrally connected by a yoke 48 of non-magnetic material. The segments are mounted to slide within the tube 61 at either end of the armature, and the yoke extends around the outside of the coil, its outer portion being supported by pins 44 extending through slots 60. Springs 58 (which are the "energy storing means" of this embodiment) bias the auxiliary member toward a point in its travel symmetrically centered with regard to the fixed magnetic structure. The spacing between the segments must be so chosen with regard to the length and travel of the armature that, with the device not energized, the armature when in either of its extreme positions will slightly displace the auxiliary member from its central position. Thus, in the situation of Fig. 8 the segment 49L is held by spring tension against the end 53L of the armature. If the device is energized under these circumstances the same segment will continue to stick to the same end, due to magnetic attraction, even though the armature moves and the tension in the springs goes the other way.

The result is that the armature is effectively lengthened by the segment. Accordingly, upon energization of the device with the movable parts in their Fig. 8 positions, said parts will be magnetically impelled to their Fig. 9 positions. Upon de-energization the auxiliary member will be shifted by tension in the springs 58 to its Fig. 10 position. Meanwhile the armature will be retained in its new position by the action of a toggle-spring 59, to which it is connected. This spring biases the armature toward either extreme of its travel and thus makes extreme positions stable positions for the armature when it is not shifting operationally from one to the other. It also serves to limit the travel of the armature where no other means is provided for the purpose.

Starting with the illustrated embodiment in its Fig. 8 condition, it can be seen from the foregoing that the end effect of applying electrical energization to the coil for a time and then removing it is to shift the movable parts from their Fig. 8 positions to their Fig. 10 positions. If subsequently the device is again energized for a time the same parts will be shifted from their Fig. 10 positions back to their Fig. 8 positions. The intermediate condition of the latter sequence, i.e., the position of the movable parts after they have moved in response to energization and while that energization yet persists, would be shown by the mirror image of Fig. 9.

Note that this description indicates four positions for the auxiliary member, in the following order for one complete cycle: slightly left, far right, slightly right, and far left. Regardless, the embodiment is best understood in relation to the other embodiments by considering only the positions of the auxiliary member relative to the armature. Only two of the latter are significant, namely the so-called working positions wherein one or the other of the segments is applied to the armature.

The embodiment as illustrated is equipped to accomplish electrical switching (of the kind known as SPST) by means of electrical contacts 60A and 60B. However, of all embodiments shown this one is the most suited for performing tasks requiring more force than is normally called for in switching applications. For performing such tasks, connections to external equipment can be substituted for the switching means shown. The equipment operated is, in any event, no part of the invention proper.

Figure 12:
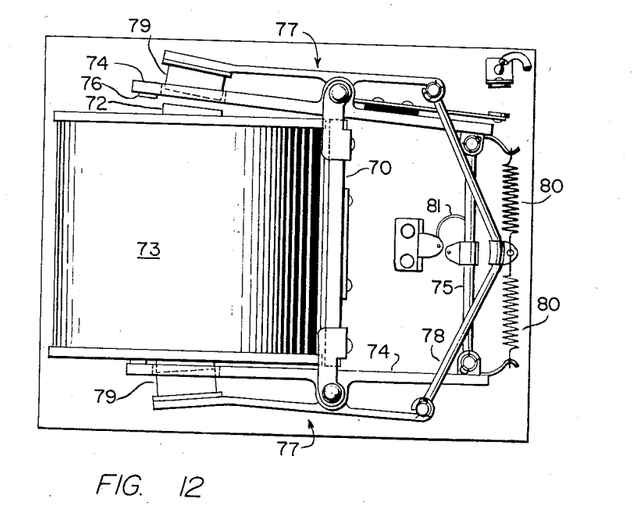
Fig. 12 is a plan view.
Figure 13:
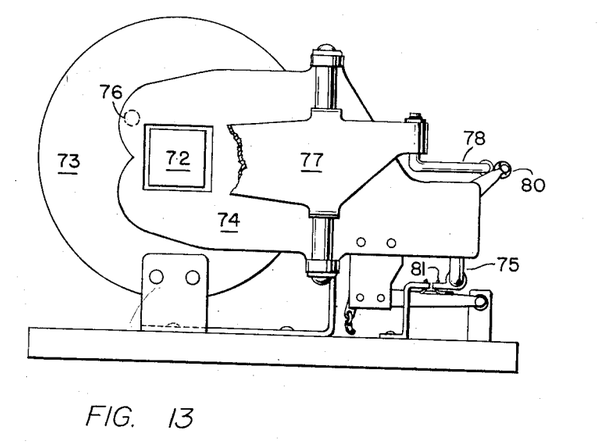
Fig. 13 is an elevation as seen from the side of the embodiment that is toward the bottom of the sheet in Fig. 12. A part in the foreground (a segment of magnetic material) is shown broken away to better reveal the construction beyond.

With particular reference to the embodiment of Figs. 12 and 13:

This embodiment is actually a variation of the embodiment of Fig. 11. However, the nomenclature used to describe the present version must necessarily be different, for here there are two armatures and two auxiliary members. Accordingly, a separate description will be required.

The fixed magnetic structure consists of a core and a magnetic member 70. The latter member is, in principle, simply the central portion of the armature of the Fig. 11 version made immovable. It is physically separated from the remainder of the fixed magnetic structure, namely the core, but is in series with the latter in the magnetic circuit. The only poles of the fixed magnetic structure that need mention are the two poles 72 of the core, which poles face air gaps of variable reluctance. These poles are radially enlarged to increase the lengths of their perimeters. As can be seen in Fig. 13, their faces are square in outline. A coil 73 covers all of the core except the poles.

The two armatures 74 are pivoted respectively near the ends of magnetic member 70. They are connected together by a link 75 and are thus movable strictly as a unit. The two armatures as linked together may be considered to make up a single armature assembly. The permitted travel of this assembly is limited by stops 76, which may be simply rivet heads adapted to engage the respective ends of the coil. The two auxiliary members 77 are respectively pivoted on the same axes with one and the other of the armatures. Each auxiliary member consists of a segment of magnetic material 79 integrally mounted on a supporting arm of non-magnetic material. A link 78 connects these members so that they, like the armatures, are movable strictly as a unit. The two members as linked together may be considered to make up a single auxiliary assembly. This assembly is movable between extreme positions where one or the other of the segments makes matching engagement with the face of its nearby pole. The extreme positions of the auxiliary assembly are thus its working positions.

The armature assembly is connected to the auxiliary assembly through an energy storing means, specifically the two springs 80. The geometry of movable parts is so arranged that when the armature assembly is in either of its extreme positions, tension in these springs will bias the auxiliary assembly to move to and remain in that one of its extreme positions wherein that pole which is most completely enveloped or enclosed by an armature will also have its corresponding segment held in place against its face. That is to say, a full stroke of the armature assembly carries the outer or separated ends of springs 80 more than far enough to produce a corresponding motion of the inner or meeting ends of these springs that would represent a full stroke of the auxiliary assembly.

Meanwhile, the armature assembly is retained in either of its extreme positions pending operational shifts from one to the other, by the action of clip or toggle spring 81. This spring has a strong spreading tension; it tends to push armature link 75 toward either extreme of its travel from a point midway of that travel. The extreme positions of the armature assembly thus become its stable positions. The force of magnetic attraction that operationally impels the armature assembly from one of its stable positions to the other has no trouble in overcoming the effect of spring 81, but vibration and other influences affecting the armature assembly between periods of energization cannot.

Study of the drawings will confirm that magnetic circumstances in the vicinities of the designated poles are similar to those obtaining in the embodiment of Figs. 5 through 7 and the embodiment of Fig. 11. That is, the reluctance at whichever pole is effectively extended by a segment will remain substantially constant despite movements of its adjoining armature end, while reluctance at the other pole will be greatly affected by coincident movements of the other armature end. Consequently, the effects of armature means movements on magnetic circuit reluctance and on the auxiliary means being comparable or equivalent as between embodiments, a full understanding of the sequential operation of the present embodiment can be had from a study of the sequences described in connection with the Figs. 5 through 7 embodiment.

With reference to all embodiments:

The description of each embodiment should be studied in the light of the preliminary statement and the descriptions of other embodiments; all embodiments have a great deal in common and any point that is not discussed in connection with one may be found to be made perfectly clear in connection with another.

Whenever I mention "magnetic materials," I have particular reference to magnetic materials of the type suited for use in electromagnetic structures, as distinguished from the type suited for use in permanent magnets.

Every separate piece of magnetic material lying in a magnetic circuit will behave like a magnet when that circuit is energized and hence must have two poles. However, I use the word "pole" herein only to apply to those magnetic terminals which belong to fixed magnetic structure and which at least part of the time face regions of variable reluctance. A pole in the magnetic sense means a region rather than a single point. I take it to mean the region from which emerges flux that is or can be effective in securing the desired operation of the device treated.

By "reciprocative motion" I mean motion that is predominately backward and forward, as distinguished from rotational motion. In speaking of the "direction" of travel of a movable part I do not necessarily mean a direction in rectangular coordinates. Thus, a pair of "reciprocally related operational directions" might be up and down, clockwise and counterclockwise, left-helical and anti-left-helical, etc.

By "tension" in a resilient means I mean any force manifesting the presence of stored potential energy in said means. Thus "tension" is used for forces due to torsion, flexion, etc.

I use the word "opening" as generic to slot, notch, hole, bore, etc.

The embodiments described herein are only representative of the diversity of designs into which the central inventive thought may be materialized. Accordingly, I do not consider the invention to reside solely in arrangements described except as hereinafter claimed.

I claim as my invention:

1. An impulse-type electromagnetic device including: armature means mounted to be movable strictly as a unit into a first or a second stable position; fixed magnetic structure positioned to generally define in combination with said armature means a magnetic circuit structure; coil means mounted in magnetically energizing relationship to said magnetic circuit structure; auxiliary means including two spaced segments of magnetic material, said auxiliary means being movable strictly as a unit into either of two working positions relative to a portion of said magnetic circuit structure, in each of which working positions a different one of said segments becomes applied to said magnetic circuit structure to arrange the magnetic attraction experienced by said armature means, when said magnetic circuit structure is energized, in a different one of two patterns, according to one of which patterns said armature means will be impelled from its first to its second stable position, according to the other of which patterns said armature means will be impelled from its second to its first stable position; and means for exerting a force on said auxiliary means biasing the latter to assume a working position selected according to which of said stable positions is currently occupied by said armature means.

2. The invention set forth in claim 1 further characterized in that said means for exerting a force on said auxiliary means consists of resilient coupling between said auxiliary means and another part of the device.

3. The invention set forth in claim 2 further characterized in that the motion permitted to said armature means is substantially reciprocative in character and still further characterized in that the motion permitted to said auxiliary means is substantially reciprocative in character.

4. The invention set forth in claim 3 further characterized in that both segments of magnetic material in said auxiliary means, in becoming applied in turn to said magnetic circuit structure as set forth, become applied only to said fixed magnetic structure portion of said magnetic circuit structure.

5. The invention set forth in claim 3 further characterized in that both segments of magnetic material in said auxiliary means, in becoming applied in turn to said magnetic circuit structure as set forth, become applied only to said armature means portion of said structure.

6. The invention set forth in claim 5 further including a device for maintaining said armature means in either of its stable positions pending operational shifts from one to the other.

7. The invention set forth in claim 4 further including a device for maintaining said armature means in either of its stable positions pending operational shifts from one to the other.

8. An impulse-type electromagnetic device including: coil means; fixed magnetic structure having a pole; an armature mounted to be movable reciprocatively between two stable positions, said armature being normally retained in either of said stable positions pending operational shifts from one to the other; an auxiliary member comprising two spaced segments of magnetic material inelastically connected to each other, said auxiliary member being mounted to be movable reciprocatively between two working positions, in each of which working positions a different one of said segments becomes applied to said pole of said fixed magnetic structure to effectively extend said structure into a different region of space, said structure as thus extended, together with said armature, being arranged to define a preferred path for the flux induced by said coil means when electrically energized, said path having an air gap therein between said armature and that one of said segments which is currently applied to said pole, the immediate location of said air gap being determined by which of said working positions is occupied by said auxiliary member, said air gap being located to have its reluctance decreased by movement of said armature in one operational direction when said auxiliary member is in a corresponding given working position, and being located to have its reluctance decreased by movement of said armature in the opposite operational direction when said auxiliary member is in the working position alternate to the given one; resilient means coupling said auxiliary member to said armature, said resilient means being so mounted that while said armature is in either of its stable positions tension in said resilient means will bias said auxiliary member to shift to and remain in the appropriate one of its working positions for determining that a movement of said armature in the direction it must travel next will be associated with a decrease in the reluctance of said air gap as thus located.

9. An impulse-type electromagnetic device including: a core having a pole at one end and an interpodal end opposite thereto; a coil surrounding said core; a fixed magnetic member attached to said interpodal end of said core and extending therefrom along the outside of said coil; an armature shaped and located to be generally extensional of said magnetic member in directions leading around the outside of said coil to the region of said pole, said armature being mounted to be movable reciprocatively between two predetermined extreme positions in a mode conveying the portion of said armature nearest to said pole in directions generally perpendicular to the axis of said core, the range of motion of said armature being centered with regard to said axis of said core, said armature being normally retained at either extreme of said range pending operational shifts from one extreme to the other; an auxiliary member comprising two spaced segments of magnetic material integrally connected by nonmagnetic material, said auxiliary member being mounted to be movable reciprocatively between two working positions, in each of which working positions a different one of said segments becomes applied to said pole, each of said segments when applied to said pole being extensional thereof in directions having a component parallel to the general direction of travel of the neighboring portion of said armature, said component being opposite in direction in the case of each different segment; and resilient means coupling said auxiliary member to said armature, said resilient means being so mounted that when said armature is in either of its extreme positions tension in said resilient means will bias said auxiliary member to move to and remain in that one of its working positions wherein said pole is extended by one of said segments in a direction away from the current position of said armature.

10. An impulse-type electromagnetic device including: coil means; an armature having two ends, said armature being mounted to be movable reciprocatively between two stable positions in a mode wherein both of said ends move over equal ranges of travel, and being normally retained in either of said stable positions pending operational shifts from one to the other; fixed magnetic structure having a first pole and a second pole respectively located near one and the other of said ends of said armature to provide an air gap of variable reluctance at each of said poles, said air gaps being so arranged with regard to the motion of said ends of said armature that, considering only the elements already named, a full stroke of said armature in one operational direction will bring about an increase of reluctance at said first pole and a decrease of reluctance at said second pole and a full stroke of said armature in the opposite operational direction will bring about an increase of reluctance at said second pole and a decrease of reluctance at said first pole, said armature and said fixed magnetic structure being arranged to establish a preferred path for the flux induced by said coil means when electrically energized, said preferred path continuously including said air gaps; a movable auxiliary member comprising two spaced segments of magnetic material inelastically connected to each other, said auxiliary member being mounted to be movable reciprocatively between two working positions, in one of which working positions one of said segments becomes applied to said first pole to effectively extend the latter in such a fashion that reluctance at said first pole will remain substantially constant despite operational movements of said armature, in the other of which working positions the other of said segments becomes applied to said second pole to effectively extend the latter in such a fashion that the reluctance at said second pole will remain substantially constant despite operational movements of said armature; and resilient means coupling said auxiliary member to said armature, said resilient means being so mounted that when said armature is in either of its stable positions tension in said resilient means will bias said auxiliary member to move to and remain in the appropriate one of its working positions for determining that a stroke of said armature in the direction it must travel next will be associated with a decrease of the combined reluctances of said air gaps as thus modified.

11. An impulse-type electromagnetic device including: a generally U-shaped fixed magnetic structure having two parallel legs, the two terminations of said fixed magnetic structure constituting the poles thereof; two coils respectively surrounding said two legs of said fixed magnetic structure; a leaf-type armature generally located in bridging position between said poles, said armature being mounted to be pivotally movable between two predetermined extreme positions and about a pivotal axis perpendicular to the plane of said fixed magnetic structure and equidistant from said poles, the ends of said armature being provided with an opening in each, said openings being shaped and located to alternately admit said poles in response to pivotal movements of said armature, said armature being normally retained in either of its extreme positions pending operational shifts from one to the other; a movable auxiliary member comprising two spaced segments of magnetic material integrally connected by a yoke of non-magnetic material, said auxiliary member being mounted for movement about a pivotal axis near to and parallel with that of said armature, said yoke extending generally externally of said armature from the region of one of said poles to the region of the other of said poles, one of said segments being carried in each of said regions, said segments being shaped and aligned to extend through said openings in said armature and alternately make engagement with the axial faces of said poles in response to pivotal movements of said auxiliary member, each of said segments engaging its corresponding pole at an opposite extreme of the motion thereby permitted to said auxiliary member; and resilient means coupling said auxiliary member to said armature, said resilient means being so mounted that while said armature is in either of its extreme positions tension in said resilient means will bias said auxiliary member to move to and remain in that one of its own extreme positions wherein that one of said poles which is most completely enveloped by said armature will also have its corresponding segment in engagement with its face.

12. An impulse-type electromagnetic device including: a core having a pole at each end; a coil surrounding said core; an armature shaped and located to extend on the outside of said coil from the region of one of said poles to the region of the other of said poles, said armature being mounted to be movable reciprocatively between two predetermined extreme positions in a mode conveying the ends of said armature conversely toward or away from said poles, said ends of said armature being provided with an opening in each, said openings being shaped and located to alternately admit said poles in response to operational movements of said armature, said armature being normally retained in either of its extreme positions pending operational shifts from one to the other; an auxiliary member mounted to be movable reciprocatively in a mode similar to that in which said armature moves, said auxiliary member comprising two spaced segments of magnetic material integrally connected by non-magnetic material, each of said segments being carried in the region of a different one of said poles, said segments being shaped and aligned to extend through said openings in said armature and alternately make engagement with the axial faces of said poles in response to operational movements of said auxiliary member, each of said segments engaging its corresponding pole at an opposite extreme of the motion thereby permitted to said auxiliary member; and resilient means coupling said auxiliary member to said armature, said resilient means being so mounted that when said armature is in either of its extreme positions tension in said resilient means will bias said auxiliary member to move to and remain in that one of its own extreme positions wherein that one of said poles which is most completely enveloped by said armature will also have its corresponding one of said segments in engagement with its face.

13. An impulse-type electromagnetic device including: coil means; an armature having a first end and a second end, said armature being mounted to be movable reciprocatively between two stable positions in a mode wherein both of said ends move over equal ranges of travel, and being normally retained in either of said stable positions pending operational shifts from one to the other; fixed magnetic structure having two poles respectively located near said first and second ends of said armature for providing an air gap of variable reluctance at each of said ends, said air gaps being so arranged with regard to the motion of said ends of said armature that, considering only the elements already named, a full stroke of said armature in one operational direction will bring about an increase of reluctance at said first end and a decrease of reluctance at said second end and a full stroke of said armature in the opposite operational direction will bring about an increase of reluctance at said second end and a decrease of reluctance at said first end, said armature and said fixed magnetic structure being arranged to establish a preferred path for the flux induced by said coil means when electrically energized, said preferred path continuously including said air gaps; a movable auxiliary member comprising two spaced segments of magnetic material inelastically connected to each other, said auxiliary member being mounted to be movable reciprocatively with said armature and between two working positions relative to said armature, in one of which working positions one of said segments becomes applied to said first end of said armature to effectively extend the latter in such a fashion that the reluctance at said first end will remain substantially constant despite operational movements of said armature, in the other of which working positions the other of said segments becomes applied to said second end of said armature to effectively extend the latter in such a fashion that the reluctance at said second end will remain substantially constant despite operational movements of said armature; and resilient means coupling said auxiliary member to non-movable portions of the device, said resilient means being so mounted that while said armature is in either of its stable positions tension in said resilient means will bias said auxiliary member to move to and remain in the appropriate one of its working positions relative to said armature for determining that a movement of said armature in the direction it must travel next will be associated with a decrease in the combined reluctances of said air gaps as thus modified.

14. An impulse-type electromagnetic device including: a coil wound about a central, axially-penetrating hole; fixed magnetic structure mounted adjacent to both ends of said coil and shaped to extend on said ends in directions having at least one radial component, said fixed magnetic structure terminating centrally in an opening at each end of said coil, said openings being axially centered and shaped to embrace axial extension of said hole through said coil, the surfaces of said fixed magnetic structure which face said openings constituting respectively the two poles of said structure; an armature adapted to slide along the axis of said coil within said hole, said armature being axially shorter than the outside dimension of the axial span of said poles, the range of travel permitted to said armature being structurally restricted, said range being determined to meet the requirement that in making a full stroke in either axial direction the armature will have completed at least the greater portion of its permitted travel before protruding beyond that one of said poles toward which it is travelling, said armature being normally retained in either of its extreme positions pending operational shifts from one to the other; a movable auxiliary member comprising two spaced segments of magnetic material integrally connected by non-magnetic material, said auxiliary member being mounted to permit said segments to slide along the axis of said coil with each segment at an opposite end of said armature, the axial distance between said segments being greater than the axial length of said armature by an amount less than the length of stroke permitted to said armature, the range of travel permitted to said auxiliary member being limited in actual operation by the presence of said armature between said segments; and resilient means biasing said auxiliary member toward a position wherein said segments would be located equidistant from the midpoint between said poles.

15. An impulse-type electromagnetic device including: coil means; an armature assembly including two armatures, each having a primary end, said armatures being so movably mounted individually and so interconnected by linkage as to be movable strictly as a unit reciprocatively between two stable positions and in a mode wherein each of said primary ends travels the same distance as the other, said armature assembly being normally retained in either of said stable positions pending operational shifts from one to the other; fixed magnetic structure having a first pole and a second pole respectively located near one and the other of said primary ends of said armatures to provide an air gap of variable reluctance at each of said poles, said air gaps being so arranged with regard to the motions of said primary ends that, considering only the elements already named, a motion of said armature assembly in one operational direction will bring about an increase of reluctance at said first pole and a decrease of reluctance at said second pole and a motion of said armature assembly in the opposite operational direction will bring about an increase of reluctance at said second pole and a decrease of reluctance at said first pole, said armatures and said fixed magnetic structure being arranged to establish a preferred path for the flux induced by said coil means when electrically energized, said preferred path continuously including said air gaps; a movable auxiliary assembly including two segments of magnetic material, said segments being so movably mounted individually and so interconnected by linkage as to be movable strictly as a unit reciprocatively between two working positions, in one of which working positions one of said segments becomes applied to said first pole to effectively extend the latter in such a fashion that the reluctance at said first pole will remain substantially constant despite operational movements of said armature assembly, in the other of which working positions the other of said segments becomes applied to said second pole to effectively extend the latter in such a fashion that the reluctance at said second pole will remain substantially constant despite operational movements of said armature assembly; and resilient means coupling said auxiliary assembly to said armature assembly, said resilient means being so mounted that while said armature assembly is in either of its stable positions tension in said resilient means will bias said auxiliary assembly to move to and remain in the appropriate one of its working positions for determining that a movement of said armature assembly in the direction it must travel next will be associated with a decrease of the combined reluctances of said air gaps as thus modified.

16. An impulse-type relay including: a core having a pole at each end; a coil surrounding said core; a magnetic member mounted parallel to said core along the outside of said coil, said magnetic member substantially matching said coil in length and longitudinal placement; two leaf-type armatures, each of said armatures being generally located in bridging position across a different one of said poles and its corresponding end of said magnetic member, said armatures being pivotally mounted for motion about pivotal axes located respectively near the ends of said magnetic member, said pivotal axes being perpendicular to the plane of said magnetic member and said core, each of said armatures being provided with an opening shaped and placed to admit its adjacent pole in response to pivotal movements of said armature; armature linkage connecting said armatures in such a manner that they are compelled to move as a unit over a range of motion confined within predetermined limits and in such a manner that when one armature approaches envelopment of its adjacent pole the other armature recedes from envelopment of its adjacent pole and vice versa, said armatures being normally retained at either extreme of their permitted travel pending operational shifts from one extreme to the other; two auxiliary members, each of said auxiliary members comprising a segment of magnetic material integrally mounted on a supporting arm of nonmagnetic material, each of said auxiliary members being separately pivotally mounted to carry its segment in the region of a different one of said poles, said segments being shaped and aligned to extend through said openings in said armatures and make engagement with the axial faces of said poles in response to pivotal movements of said auxiliary members; auxiliary linkage connecting said auxiliary members in such a manner that they are compelled to move as a unit and in such a manner that at each extreme of the motion thereby permitted to said auxiliary members a different one of said segments engages its corresponding pole; and resilient means coupling said auxiliary members as a unit to said armatures as a unit, said resilient means being so mounted that when said armatures are in either extreme position tension in said resilient means will bias said auxiliary members to move to and remain in that extreme position wherein that one of said holes which is most completely enveloped by an armature will also have its corresponding one of said segments in engagement with its face.

17. An impulse-type electromagnetic device including: armature means mounted to be capable of executing two reciprocally related motions in alternating sequence; fixed magnetic structure positioned to generally define in combination with said armature means a magnetic circuit structure; coil means adapted to magnetically energize said magnetic circuit structure intermittently in response to intermittent electrical energization of said coil means; and controlling means adapted to apply additional magnetic material exclusively to said fixed magnetic structure in two different manners in alternating sequence in delayed response to operational motions of said armature means, the resultant effective shape imparted to said magnetic circuit structure being so determined in each case as to elicit upon succeeding energization the sequentially appropriate motion of said armature means.

18. An impulse-type electromagnetic device including: armature means mounted to be capable of executing two reciprocally related motions in alternating sequence; fixed magnetic structure positioned to generally define in combination with said armature means a magnetic circuit structure in which each fixed pole is singular; coil means adapted to magnetically energize said magnetic circuit structure intermittently in response to intermittent electrical energization of said coil means; and controlling means adapted to apply additional magnetic material to said magnetic circuit structure in two different manners in delayed response to operational motions of said armature means, the resultant effective shape imparted to said magnetic circuit structure being so determined in each case as to elicit upon succeeding energization the sequentially appropriate motion of said armature means, said controlling means being so constructed that the entirety of said additional magnetic material is shifted in unison from one manner of application to the other.

19. An impulse-type electromagnetic device including: armature means mounted to be movable into a first or a second stable position; fixed magnetic structure positioned to generally define in combination with said armature means a magnetic circuit structure in which each fixed pole is singular; auxiliary magnetic material mounted to be movable into position to augment said magnetic circuit structure in such manners as to impart either of two effective conformations thereto, according to one of which conformations said armature means will be impelled from its first to its second stable position upon magnetic energization of said structure, and according to the other of which conformations said armature means will be impelled from its second to its first stable position upon magnetic energization of said structure, the entirety of said auxiliary magnetic material being arranged to be movable only in unison; potential-energy-storing means adapted to position said auxiliary magnetic material in accordance with the positioning of said armature means; and coil means mounted in magnetically energizing relationship to said magnetic circuit structure.

20. An impulse-type electromagnetic device including: armature means mounted to be movable strictly as a unit into either of two stable positions; fixed magnetic structure positioned to generally define in combination with said armature means a magnetic circuit structure in which each fixed pole is singular; auxiliary means at least partially constructed of magnetic material and mounted adjacent to said magnetic circuit structure to be movable strictly as a unit into position to contribute to the effective shape of said structure in either of two different fashions according to which said auxiliary means is enabled to selectively determine through its own positioning which of said two stable positions said armature means will be impelled into when said magnetic circuit structure is energized, said auxiliary means being arranged to be subject both to controlling forces biasing it to change its determination every time said armature means changes stable positions and to magnetic attraction postponing response to said controlling forces while said magnetic circuit structure is energized; potential-energy-storing means adapted to exert said controlling forces; and coil means mounted in magnetically energizing relationship to said magnetic circuit structure.

21. An impulse-type electromagnetic device including: armature means mounted to be capable of executing two reciprocally related motions in alternating sequence; fixed magnetic structure positioned to generally define in combination with said armature means a magnetic circuit structure in which each fixed pole is singular; coil means adapted to magnetically energize said magnetic circuit structure intermittently in response to intermittent electrical energization of said coil means; and controlling means adapted to apply additional magnetic material exclusively to said armature means in two different manners in alternating sequence in delayed response to operational motions of said armature means, the resultant effective shape imparted to said magnetic circuit structure being so determined in each case as to elicit upon succeeding energization the sequentially appropriate motion of said armature means.

References Cited in the file of this patent
UNITED STATES PATENTS 2,515,258    O'Brien et al. _________ July 18, 1950

FOREIGN PATENTS 403,992    Great Britain _________ Dec. 27, 1933

OTHER REFERENCES

"Relays for Electronic and Industrial Control" (Walker) (London), 1953 (pages 265–266).